P. H. STARKE.
Plow.
No. 85,342.
Patented Dec. 29, 1868.
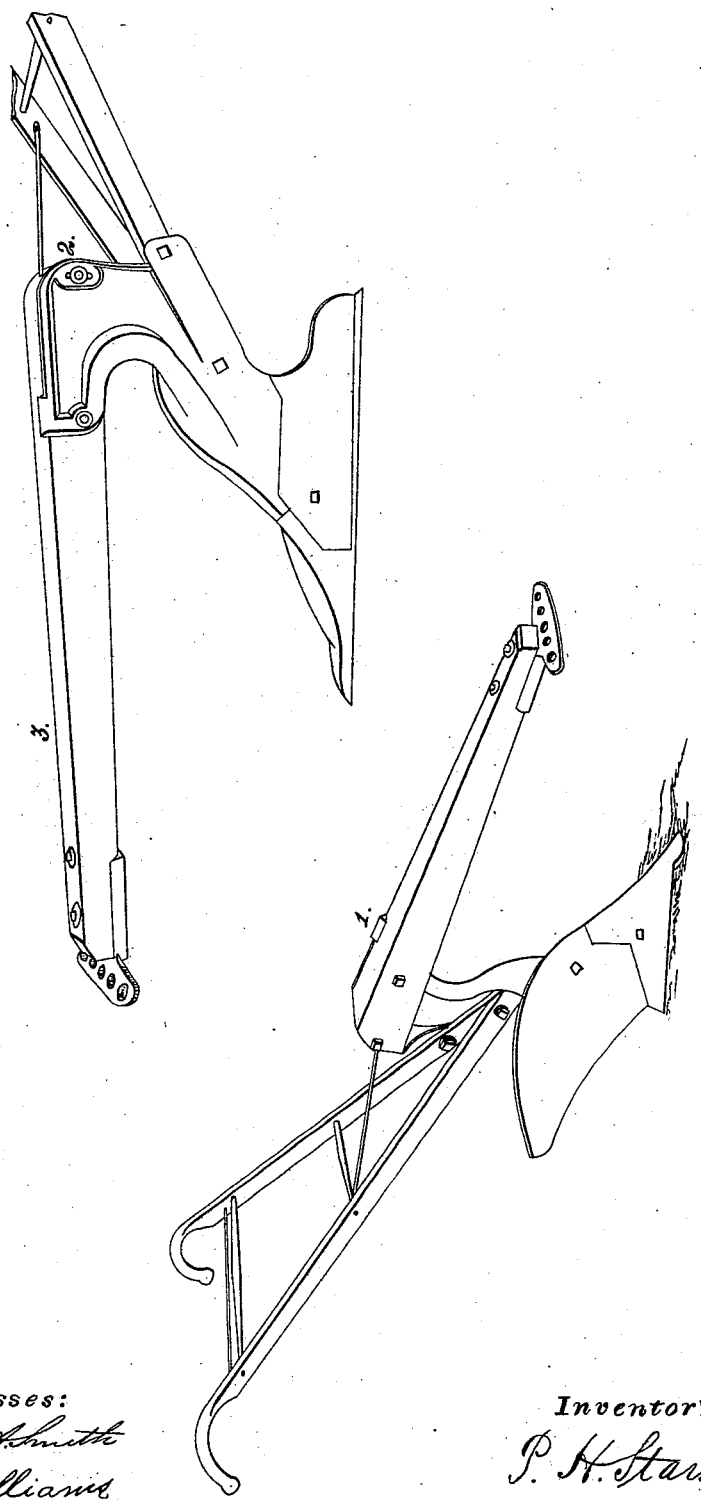
Witnesses:
Inventor:

United States Patent Office.

P. H. STARKE, OF RICHMOND, VIRGINIA.

Letters Patent No. 85,342, dated December 29, 1868.

IMPROVEMENT IN PLOWS.

The Schedule referred to in these Letters Patent and making part of the same.

Be it known that I, P. H. STARKE, of the city of Richmond, State of Virginia, have invented a new and useful Improvement in Plows; and I do hereby declare that the following is a full and exact description of the same, reference being had to the accompanying drawings, and to the figures of reference marked thereon.

To enable others skilled in the art to make and use my invention, I proceed to describe its construction and operation.

My invention is confined to the standard or frame-piece of the plow, and the stocking or wooding attached thereto.

All other plows are made of wooden beams, running back to and fastening to the handles, or of iron, running from the clevis over the mould-board to the base of the plow in the rear; and, whenever it is desired to make a high plow under the beam, it must be made very crooked—if of wood, so crooked as to destroy its strength, and run too high upon the handles, so as to destroy the symmetry and proportion of the plow, and if of iron, to require so much metal as to make it both too heavy and too expensive.

I make the standard-piece of iron, inclining back from the point at which it leaves the mould-board, and then upward as high as is desired, then extending in a line toward the clevis just far enough to form a fastening for a wooden beam to bolt to, say about ten inches, and the balance of the beam is a straight piece of wood, the beam having no connection with the handles, extending no further back than the point at which it fastens to the standard, thus enabling me to make a plow of any height with a straight wooden beam.

Figure 1 is a perspective view of the plow complete.

Figure 2 is the standard-piece, of iron.

Figure 3 is the wooden beam.

All the other parts of the plow are like others in common use, and the invention is so easily understood that I deem it unnecessary to describe it more minutely.

Having described my invention,

What I claim, is—

A plow-standard, constructed and arranged so as to receive a straight wooden beam and handles, with suitable mould-board and landside, as shown and described.

P. H. STARKE.

Witnesses:
W. A. ELLIOTT,
P. B. BARNES.